Nov. 11, 1952     C. M. BACKUS     2,617,399
TEMPERATURE REGULATING APPARATUS FOR INTERNAL-COMBUSTION ENGINES
Filed Nov. 2, 1949     2 SHEETS—SHEET 2

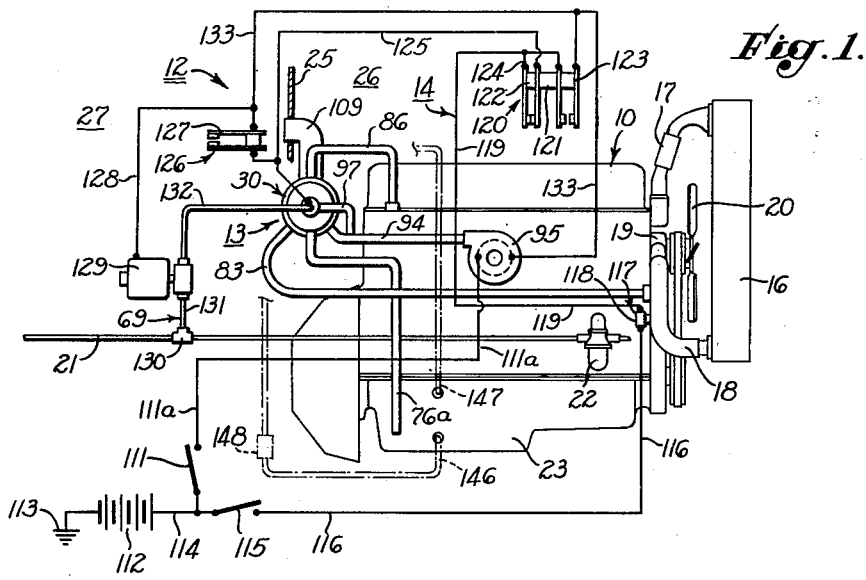

INVENTOR.
CHARLES M. BACKUS
BY HIS ATTORNEYS.
HARRIS, KIECH, FOSTER & HARRIS

Patented Nov. 11, 1952

2,617,399

UNITED STATES PATENT OFFICE 2,617,399

TEMPERATURE REGULATING APPARATUS FOR INTERNAL-COMBUSTION ENGINES

Charles M. Backus, Los Angeles, Calif.

Application November 2, 1949, Serial No. 125,074

18 Claims. (Cl. 123—142.5)

This invention relates to heaters and, more particularly, to a heater adapted to be utilized in conjunction with an internal combustion engine for maintaining the temperatures of the coolant and lubricant used in said engine at or above a predetermined norm.

One of the greatest difficulties encountered in using vehicles equipped with internal combustion engines under below freezing temperature conditions is the fact that the coolants and lubricants used in such engines freeze or become excessively viscous during the period when the vehicles are inactive and are exposed to freezing temperatures. The freezing of the coolant in the cooling system of vehicular internal combustion engines is a phenomenon frequently encountered when automobiles, particularly, are exposed to below freezing temperatures for prolonged periods of time, as at night, or when parked in exposed locations. The freezing of the coolant in the cooling system of internal combustion engines makes them very difficult to start and prevents the proper operation of the cooling system for a considerable time after the engine has been started resulting in boiling and steaming and improper cooling of the engine. When temperatures are encountered which are low enough to render the lubricant used in the lubricating system of internal combustion engines exceedingly viscous, that is, viscous to such extent that there is a resistance to free flow of the lubricant through the lubricating system of the engine, such resistance to flow results in improper lubrication of the engine during the initial running of the engine and frequently results in burned out bearings and the failure of portions of the engine which are customarily lubricated by the lubricant.

It is, therefore, a primary object of my invention to provide a heater for the engine of a vehicle which is designed to maintain the coolant in the cooling system of the engine at or above a predetermined temperature when the engine is exposed to below freezing temperatures. It is an associated object of my invention to provide a heater for a vehicular engine which is designed to maintain the lubricating fluid in the lubricating system of the engine at a predetermined temperature when the engine is exposed to temperatures which would render the lubricating fluid exceedingly viscous.

In order to properly illustrate the construction and mode of operation of my invention, it will be described as embodied in the internal combustion engine of an automobile but it is not intended that the application of my invention be limited to any particular vehicle since it is obvious that it might be equally well applied to such vehicles as boats and airplanes, the engines of which may be liquid cooled and liquid lubricated. If the engine of a vehicle is air cooled, the heater of my invention can be utilized to maintain the temperature of the lubricant alone above a predetermined temperature. For instance, the heater of my invention could be applied for use with air cooled radial engines conventionally utilized in aircraft since the lubricant used in such engines tends to become almost solid when such aircraft are used in areas where their engines are subjected to extremely low temperatures. Conventionally, such engines must be heated by the use of externally applied heat for long periods of time prior to taking off. By the use of my invention, the temperature of the engine can be maintained at a predetermined norm during the inactivity of the aircraft and immediate takeoffs are thus rendered possible.

A further object of my invention is the provision of a temperature regulating apparatus for the cooling and lubricating systems of an internal combustion engine which can be voluntarily energized when the vehicle in which the engine is embodied is exposed to below freezing temperatures for prolonged periods of time and which can be voluntarily deenergized during the activity of the vehicle unless the temperatures in which the vehicle is operating are so low that the heating of the fluids in the cooling and lubricating systems is necessary.

Another object of my invention is the provision of a temperature regulating apparatus of the aforementioned type which can be energized voluntarily and which, subsequent to such voluntary energization, will be automatically energized and deenergized by a control circuit embodied in the apparatus.

An additional object of my invention is the provision of a temperature regulating apparatus for the cooling and lubricating systems of internal combustion engines which includes heater means and control circuit means for regulating the operation of said heater means in response to variations of the temperatures of the fluids used in the cooling and lubricating systems. An associated object of my invention is the provision in the control circuit of automatic control means responsive to temperature variations in various portions of the heater and also responsive to temperature variations in the coolant and lubricant in the cooling and lubricating systems.

A further object of my invention is the provision of a temperature regulating apparatus for the cooling and lubricating systems of an internal combustion engine which includes a control means for energizing and deenergizing the apparatus automatically in response to temperature variations in the fluid used in the cooling system of the engine.

Another object of my invention is the provision of a temperature regulating apparatus for the cooling and lubricating systems of an internal combustion engine which include a heater provided with electrically energizable igniter means and with fuel supply means adapted to supply fuel to said heater, said fuel supply means being energizable by the action of a control means which is responsive to temperature variations in said igniter and which energizes said fuel supply means when said igniter reaches a predetermined temperature.

An additional object of my invention is the provision of a heater for a temperature regulating apparatus of the aforementioned type which incorporates a first igniter adapted to initiate the combustion cycle in the heater and a second igniter adapted to carry on the combustion cycle after the first igniter is extinguished. An associated object of my invention is the provision of a control means responsive to the temperature of the second igniter adapted to automatically extinguish the first igniter when the second igniter has reached a predetermined temperature.

A further object of my invention is the provision of a heater for a temperature regulating apparatus of the aforementioned type in which the first igniter is electrically energizable and the second igniter is brought and kept at a predetermined temperature by the action of the combustion gases in the heater.

An additional object of my invention is the provision of a heater for a temperature regulating apparatus of the aforementioned type which includes a combustion chamber having juxtaposed thereto a fluid chamber to permit the fluid in said chamber to receive the heat from said combustion chamber to accomplish the heating of the fluid in the cooling or lubricating systems of an internal combustion engine.

Another object of my invention is the provision of a heater for a temperature regulating apparatus of the aforementioned type which includes a combustion chamber having juxtaposed thereto a fluid chamber to permit the fluid in said chamber to be heated by the combustion taking place in said combustion chamber, and in which an air chamber is juxtaposed to said fluid chamber to permit the air in said air chamber to be heated by the heated fluid in said fluid chamber.

A further object of my invention is the provision of a heater for a temperature regulating apparatus of the aforementioned type which includes an air chamber for heating air passing therethrough and which has provided thereupon means for directing the heated air into the passenger compartment or into the engine compartment of the vehicle with which the temperature regulating apparatus is associated.

Another object of my invention is the provision of a heater for a temperature regulating apparatus of the aforementioned type which includes a combustion chamber having juxtaposed thereto a coolant chamber, said coolant chamber having juxtaposed thereto an air chamber and said air chamber having juxtaposed thereto a lubricant chamber to permit the simultaneous heating of the coolant, air and lubricant.

A further object of my invention is the provision of a temperature regulating apparatus of the aforementioned type which can be utilized to cool the fluid in the cooling system of an internal combustion engine when the temperature in said cooling system rises above a predetermined norm.

Other objects and advantages of my invention will be apparent from the following specification and the accompanying drawings which are for the purpose of illustration only, and in which:

Fig. 1 is a side elevational view showing the component parts of the temperature regulating apparatus of my invention associated with an internal combustion engine;

Fig. 2 is a longitudinal sectional view of the preferred embodiment of the heater incorporated in the temperature regulating apparatus of my invention;

Figure 3:
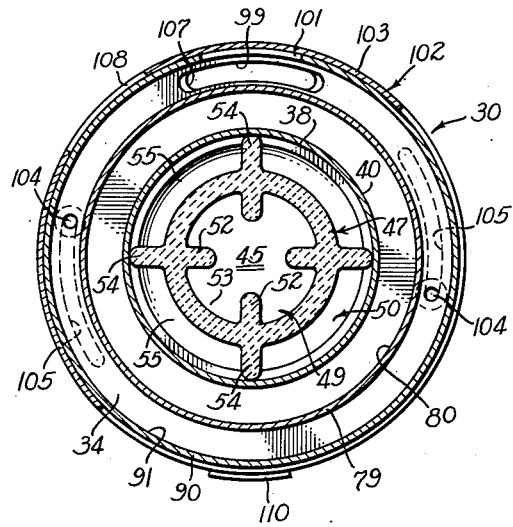
Fig. 3 is a vertical sectional view taken on the broken line 3—3 of Fig. 2.

Referring to the drawings, and particularly to Fig. 1 thereof, I show an internal combustion engine 10 which has associated therewith a temperature regulating apparatus 12 constructed in accordance with my invention and including a heater means 13 and a control circuit 14 therefor. The internal combustion engine 10 has associated therewith a radiator 16 which is connected to the block of the engine 10 and to the cooling system thereof, not shown, by means of hose and pipe connections 17 which permit heated coolant from the engine cooling system to be transmitted into the radiator 16 at the top thereof. The lower end of the radiator 16 is connected by means of a hose 18 to the intake of a pump 19 which causes the coolant to flow through the cooling system of the internal combustion engine 10. A fan 20 mounted upon the shaft of the pump 19 draws cooling air through the radiator 16 and propels it over the engine 10.

The fuel supply for the engine is brought thereto by means of a fuel line 21 which is connected at one end to a fuel tank, not shown, and at the other end to a fuel pump 22 adapted to supply fuel to the engine 10. An oil pan 23 mounted on the under side of the engine 10 serves as a reservoir for the lubricant which is used in the lubricating system of the engine. A firewall 25 divides the body of the vehicle into an engine compartment 26 and a passenger compartment 27, the internal combustion engine 10 being located in the engine compartment 26 on one side of the firewall 25.

Secured to the engine compartment side of the firewall 25 and thus located in the engine compartment 26 is the heater means 13 of the temperature regulating apparatus 12. The heater means 13 includes a heater 30 which is secured to the engine compartment side of the firewall 25 by means of a mounting block 31 having rigidly attached thereto and integrally formed therewith mounting flanges 32 which permit the heater to be secured to the firewall 25 by the use of appropriate fasteners.

The heater 30 includes a first end wall 34 which is of circular configuration and has integrally formed therewith an annular mounting boss 35 provided with external threads 36 which are adapted to be received by the threaded interior of a recess 37 formed in the mounting block 31.

The first end wall 34 is formed of steel or similar material adapted to resist the high temperatures which are encountered in the heater 30, and includes an annular shoulder 38 which is adapted to have fitted thereupon one end of a cylindrical jacket 40 formed of steel or similar material and defining in conjunction with a second end plate 42 having an annular shoulder 43, upon which the opposite end of the jacket 40 is mounted, a combustion chamber 45. Positioned in the combustion chamber 45 is a substantially cylindrical guide member 47 formed of ceramic or other refractory material adapted to resist the high temperatures encountered in the combustion chamber 45. The guide member 47 is designed to channel the products of combustion in order that complete combustion will take place and the most effective use and distribution of the products of combustion will occur. To accomplish this desirable end, the guide member 47 serves to divide the interior of the combustion chamber 45 into a first combustion passage 49 and a second combustion passage 50. The interior of the guide member 47 is provided with a plurality of inwardly directed, longitudinal ribs 52 which divide the first combustion passage 49 into a plurality of elongated longitudinal channels 53 to secure the more effective distribution and combustion of the combustion gases.

Formed upon and integrally with the exterior of the guide member 47 are longitudinal ribs 54 which serve to divide the second combustion passage 50 into a plurality of channels 55 and which contact the jacket 40 to conduct heat thereto. As the gases of combustion pass through the channels 53 of the first combustion passage 49, the material of which the guide member 47 is formed is brought to a high temperature which causes the complete combustion of the gases of combustion as they pass therethrough and when the gases of combustion reach the second combustion passage 50 and the channels 55 thereof, they are properly distributed about the interior of the jacket 40 for a purpose which will be described in greater detail hereinafter.

In order to insure the proper transfer of the gases of combustion from the longitudinal channels 53 of the first combustion passage 49 to the longitudinal channels 55 of the second combustion passage 50 the first end plate 34 is provided with a dished inner surface 56 which serves to distribute the gases of combustion equally among the longitudinal channels 55 of the second combustion passage 50.

Formed in the second end plate 42 and located centrally thereof is a cylindrical recess 58, the end plate 42 having an aperture 59 communicating therewith in which is positioned a first igniter means 60 exemplified by a glow plug 61 which is connected in the control circuit 14 in a manner which will be described in greater detail below. The glow plug 61 of the igniter means 60 has juxtaposed thereto a second igniter means 62 constituted by a first refractory cylindrical sleeve 63 fitted over the outer surface of the glow plug and a second refractory cylindrical sleeve 64 spaced therefrom and positioned adjacent to and spaced from the wall of the cylindrical recess 58 to define an annular fuel passage 65 therebetween.

Communicating with the fuel passage 65 and formed in the second end wall 42 are apertures 67 which are adapted to receive fuel jets 68 which constitute a portion of the fuel supply means 69 of the temperature regulating apparatus, which will be described in greater detail below. Disposed between the inner wall of the recess 58 and the exterior of the second refractory sleeve 64 of the second igniter means 62, is an annular baffle 70 which is positioned adjacent the end of the annular fuel passage 65 and which serves to retard the flow of ignited fuel into the combustion chamber 45 to insure the complete ignition of the fuel by the first igniter means 60 or the second igniter means 62. A gap 71 defined by the inner circumference of the baffle 70 permits the passage of the ignited fuel from the fuel passage 65 into the combustion chamber 45.

Formed in the second end wall 42 and communicating with the interior of the cylindrical recess 58, and more particularly, the fuel passage 65 defined by the first and second refractory sleeves 63 and 64, are air passages 72 which are adapted to receive air from an air manifold 73, said manifold being mounted in a manifold head 74 which is threadedly secured to the outer end of the second end wall 42.

A plurality of exhaust passages 75 is formed in the second end wall 42, said exhaust passages 75 communicating with the channels 54 of the second combustion passage 50. An annular exhaust passage 76 is formed in the manifold head 74 and communicates with the ends of the exhaust passages 75 formed in the second end wall 42 serving to discharge the exhaust gases into an exhaust pipe 76a which, in turn, discharges the exhaust gases from the combustion chamber 45 to atmosphere.

Mounted upon shoulders 77 and 78 formed respectively upon the first end wall 34 and the second end wall 42 is a cylindrical jacket 79 formed of steel or similar material which, in conjunction with the exterior of the cylindrical jacket 40, constitutes a coolant chamber 80 which is adapted to receive coolant from the cooling system of the internal combustion engine 10 to permit the heating of the coolant in the coolant chamber 80, by heat transmitted from the combustion chamber 45 through the jacket 40 of said combustion chamber. The coolant chamber 80 has a coolant inlet opening 81 to which is connected a pipe 82 to which is, in turn, secured a tubing 83 connected with the tubing 18 of the radiator to permit the coolant to pass from the cooling system into the coolant chamber 80 to be heated therein. A coolant outlet opening 84 is formed in the jacket 79 at the upper side of the coolant chamber 80 to permit the passage of heated coolant from the coolant chamber 80 through a pipe 85 attached to the jacket 79 and a tubing 86 which is attached to the cooling system of the internal combustion engine 10. In this manner, coolant from the internal combustion engine 10 may be circulated through the coolant chamber 80 to permit the heating of the coolant and the subsequent return of the coolant into the cooling system of the internal combustion engine 10.

Disposed between and mounted on shoulders 88 and 89 formed respectively upon the first end wall 34 and the second end wall 42 is a cylindrical jacket 90 formed of steel or similar material and defining, in conjunction with the outer surface of the jacket 79, an air chamber 91 through which is adapted to pass air which is heated by contact with the jacket 79 which, in turn, is heated by contact with the heated coolant in the coolant chamber 80. An air inlet opening 92 is formed in the jacket 90 and has connected thereto a pipe 93 which is connected to a tubing 94 which communicates with an electrically operated blower 95, thus providing a constant flow of air through the air chamber 91 to provide a source of heated air for the heating of the passenger compartment 27 or the engine compartment 26 of the vehicle, in a manner which will be described in greater detail below. The blower 95 is also connected by means of a pipe 96 and a tubing 97 to the air manifold 73 which supplies a constant flow of air through the air passages 72 to the fuel passage 65.

Formed in the first end wall 34 and communicating with the interior of the air chamber 91 is an air passage 99 through which air from the interior of the air chamber 91 may pass into the engine compartment of the vehicle to heat the same. Formed in the jacket 90 adjacent the air passage 99 is an air outlet 101 which communicates with the air chamber 91 and which is adapted to permit the passage of air therefrom through a conduit 109 into the passenger compartment 27 to heat said compartment. To control the flow of air through the air passage 99 and the air outlet 101, air control means 102 is provided, said air control means consisting of a cylindrical baffle plate 103 rotatably secured to the first end plate 34 by means of screws 104 positioned in slots 105 formed in the baffle plate 103. A first air outlet opening 107 is formed in the cylindrical baffle plate 103 and is adapted to register with the air passage 99 formed in the first end plate 34 to permit the passage of air from the interior of the air chamber 91 into the engine compartment 26 of the vehicle. A second air outlet opening 108, Fig. 3, is formed in the baffle plate 103 and adapted to register with the air outlet opening 101 in the jacket 90 to permit the passage of air from the interior of the air chamber 91 into the conduit 109 to permit the discharge of said air into the passenger compartment 27. A control handle 110 is secured to the rotatable baffle plate 103 to permit the rotation thereof to cause either the first air outlet opening 107 or the second air outlet opening 108 to be juxtaposed to the air outlet passage 99 or the air outlet opening 101 to accomplish the heating of the engine or passenger compartment. Of course, the baffle plate 103 may be so adjusted by means of the handle 110 that warm air from the air chamber 91 will be simultaneously discharged into the passenger compartment and into the engine compartment. However, when the vehicle is inactive and there is no need for heating the passenger compartment, the entire flow of warm air can be discharged into the engine compartment to supplement the action of the heater in heating the coolant in the cooling system of the engine.

Although the chamber 80 has been designated as the coolant chamber adapted to heat the coolant from the cooling system of the internal combustion engine 10, it is not intended that its use be limited to the heating of the coolant since if the heater under discussion were incorporated in an aircraft having an air cooled engine the chamber 80 would be utilized to heat the oil used in the lubricating system of the aircraft engine.

The control circuit 14 of the temperature regulating apparatus 12 includes a power source indicated as a battery 112 grounded at 113 and connected by a lead 114 to a manual switch 115 which, when open, deenergizes the control circuit 14 and prevents the energization of the heater means 13. When closed, the switch 115 permits the passage of current from the battery 112 through the lead 114 into a lead 116 which transmits current to a first control means 117 constituted by a thermostatically actuated switch 118 which is responsive to the temperature of the coolant in the tubing 18 and which is adapted, when the control circuit is closed by the switch 115 to automatically close the control circuit 14 in response to the falling of the temperature of the coolant below and to automatically open the circuit with the rising of the temperature of the coolant above a predetermined norm.

The thermostatic switch 118 is connected by means of a lead 119 to a second control means 120 which is exemplified as a double thermostatic switch 121 having a first pair of contacts 122 and a second pair of contacts 123. The first pair of contacts 122 is a normally closed pair and the second pair of contacts 123 is a normally open pair, the lead 119 from the thermostatic switch 118 being connected through the normally closed pair 122 by means of a tap 124. The end of the lead 119 is connected to the normally open pair 123. Current thus flows through the normally closed pair 122 of the thermostatic switch 121 through a lead 125 to the glow plug 61. Thus, when the temperature of the coolant in the cooling system of the internal combustion engine 10 drops below a predetermined temperature subsequent to the closing of the manual switch 115, the thermostatic switch 118 will close to permit the passage of current therethrough to the thermostatic switch 121, the current passing through the closed pair of contacts 122 into the lead 125 and thence to the glow plug 61. The glow plug 61 is ignited and when it reaches a predetermined temperature, a third control means 126, exemplified as a thermostatic switch 127, which is normally open, closes causing current to flow through a lead 128 to an electric fuel pump 129 which is connected to the fuel line 21 by means of a T-connection 130 and a tubing 131. The fuel pump 129 is connected to the fuel nozzles 68 by means of tubing 132 and thus supplies the fuel to the heater after the glow plug 61 has reached a predetermined temperature.

Simultaneously with the activation of the fuel pump 129 of the fuel supply system 69, the blower 95 is activated through a lead 133 connected thereto to cause the blower 95 to force air through the tubing 96 into the fuel passage 65 to volitilize the fuel passing from the fuel jets 68 to increase the combustibility of the fuel and facilitate the ignition thereof by the glow plug 61.

When the second igniter means 62 as constituted by the first refractory sleeve 63 and the second refractory sleeve 64 reaches a predetermined temperature which is sufficient to maintain combustion of the fuel injected into the fuel passage 65 by the jets 68, the first pair of contacts 122 of the thermostat 121 opens to inactivate the glow plug 61. Simultaneously with the inactivation of the glow plug 61 by the opening of the first pair of contacts 122, the second pair of contacts 123 is closed to permit current to continue to flow to the electric fuel pump 129 through the lead 128 and the blower 95 through the lead 133.

By the provision of the control circuit 14 the heater 30 is automatically energized by the closure of the thermostatic switch 118 when the temperature of the coolant in the cooling system of the engine 10 falls below a predetermined norm. Upon the closure of the thermostatic switch 118, the glow plug 61 is ignited. When the glow plug 61 reaches a predetermined temperature, the third control means 126, as constituted by the thermostat 127, closes to energize the fuel pump 129 and the blower 95. Subsequently, when the second igniter means 62 has reached a predetermined temperature, the first pair of contacts 122 of the thermostatic switch 121 is opened to deenergize the glow plug 61 to permit combustion to be accomplished by the second igniter means 62.

A manual switch 111 connected to the battery 112 by the lead 114 is, in turn, connected to the blower 95 by a lead 111a. When the coolant in the cooling system of the engine becomes too hot, the switch 111 may be closed to energize the blower 95 and to force air through the air chamber 80 to reduce the temperature of the coolant. Thus the heater can also be used to reduce the temperature of the overheated coolant.

Figure 4:
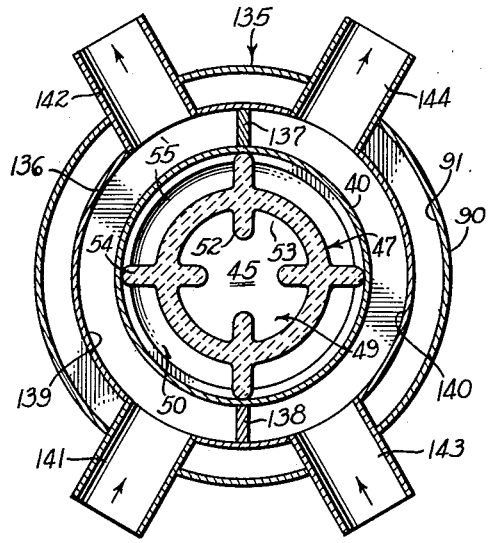
Fig. 4 is a vertical sectional view of a modified form of the heater of my invention; and, Fig. 5 is a vertical sectional view of another embodiment of the heater of my invention.

Shown in Fig. 4 of the drawings is an alternative embodiment of the heater of the temperature regulating apparatus which is adapted to simultaneously accomplish the temperature regulation of the coolant and lubricant of the engine 10. In the description of this embodiment, the portions thereof which are identical to those of the previously discussed embodiment are indicated by identical reference numerals. The heater 135 has a combustion chamber 45 defined by a jacket 40 enclosing a ceramic guide member 47 which is identical in design and function to the ceramic guide member 47 of the previously discussed embodiment.

Another jacket 136 is spaced from and encompasses the first jacket 40. The annular space between the jacket 40 and the jacket 136 is divided by partitions 137 and 138 to provide a coolant chamber 139 and a lubricant chamber 140. The coolant chamber 139 is provided with an inlet opening 141 and an outlet opening 142 adapted to permit the passage thereinto and therefrom of coolant which is heated by the heat transmitted from the gases of combustion through the jacket 40. The lubricant chamber 140 has an inlet opening 143 and an outlet opening 144 connected thereto adapted to permit the passage through the lubricant chamber 140 of lubricant which is heated by contact with the outer surface of the jacket 40 which is, in turn, heated by the combustion gases within the combustion chamber 45. The inlet opening 143 of the lubricant chamber 140 is connected by tubing 146 to the oil pan 23 of the engine 10 while the outlet opening 144 of the lubricant chamber 140 is connected by means of a tubing 147 to the oil pan 23 adjacent the top thereof. A thermostatic valve 148 located in the tubing 146 is adapted to close to prevent the passage of lubricant therethrough into the chamber 140 when the lubricant has reached a predetermined temperature. Of course, a thermostatic switch similar to the thermostatic switch 118 could be incorporated in the tubing 146 in place of the thermostat 148 to cause the energization of the temperature regulating apparatus by the temperature drop of the lubricant or when the temperature regulating apparatus is used for regulating the temperature of the lubricant only.

Figure 5:
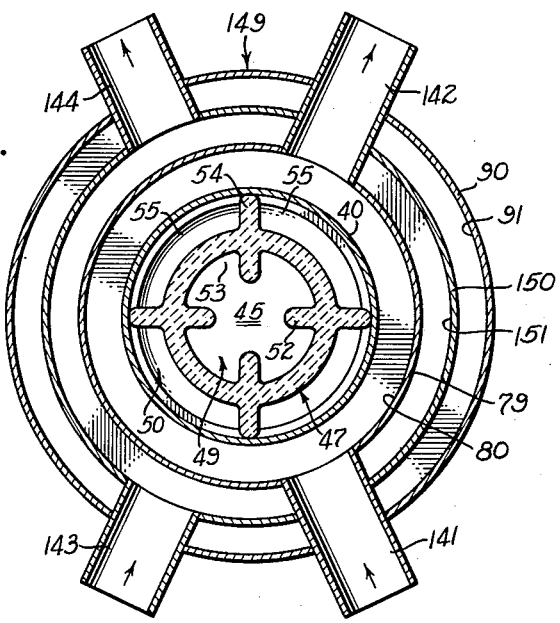

Another embodiment of the heater of the temperature regulating apparatus is exemplified as heater 149 in Fig. 5 of the drawings. Portions of the heater 149 which are identical with the portions of the previously discussed embodiments are identified by identical reference numerals. In this embodiment, the coolant chamber 80 is juxtaposed to and encompasses the combustion chamber 45. Spaced from the jacket 79 defining the coolant chamber 80 is a jacket 150 which encompasses the jacket 79 and defines a lubricant chamber 151 which completely surrounds the coolant chamber 80. The air chamber 91, in turn, completely surrounds the lubricant chamber 151. Inlet and outlet openings 141 and 142 are provided for the coolant chamber 80 and inlet and outlet openings 143 and 144 are provided for the lubricant chamber 151.

By the utilization of the heater 149, the temperatures of the coolant and lubricant of the internal combustion engine 10 may be simultaneously regulated, the heat from the combustion chamber being transferred in turn from the coolant to the lubricant and thence to the air.

Although I have shown and described specific embodiments of my invention for the purpose of illustrating the construction and the mode of operation thereof, it is obvious that changes, alterations and modifications may be made in the specific details of said embodiments and I, therefore, do not desire to be limited to such specific details but prefer, rather, to be afforded the full scope of the following claims.

I claim as my invention:

1. In a temperature regulating apparatus for regulating the temperature of a fluid in the cooling system or lubricating system of a vehicular engine in a vehicle having a passenger compartment, the combination of: a heater for said fluid mounted in said vehicle and connected to said engine for heating said fluid to a predetermined temperature, said heater having a passenger compartment outlet for heated air and a fluid chamber in continuous communication with said cooling system; and a control circuit for regulating the operation of said heater, said circuit including voluntary control means adapted to permit the energizing of said circuit and first control means responsive to the temperature of said fluid in said system for automatically energizing and deenergizing said heater subsequent to the energizing of said control circuit by said voluntary control means.

2. In a temperature regulating apparatus for regulating the temperature of a fluid in the cooling system or lubricating system of a vehicular engine in a vehicle having a passenger compartment, the combination of: a heater for said fluid mounted in said vehicle and connected to said engine for heating said fluid to a predetermined temperature, said heater having a passenger compartment outlet for heated air and a fluid chamber in continuous communication with said cooling system; and a control circuit for regulating the operation of said heater, said control circuit including voluntary control means adapted to energize and deenergize said control circuit and first thermostatic control means responsive to the temperature of said fluid in said system for automatically energizing and deenergizing said heater subsequently to the energization of said control circuit by said voluntary control means.

3. In a temperature regulating apparatus for regulating the temperature of a fluid in the cooling system or lubricating system of a vehicular engine, the combination of: a heater for said fluid mounted in said vehicle and connected to said engine for heating said fluid to a predetermined temperature, said heater including a combustion chamber having an igniter mounted therein and fuel supply means for supplying fuel to said chamber for ignition by said igniter; and a control circuit for energizing and deenergizing said heater, said control circuit including first control means for automatically energizing and deenergizing said heater and second control means for automatically deenergizing said igniter.

4. In a temperature regulating apparatus for regulating the temperature of a fluid in the cooling system or lubricating system of a vehicular engine, the combination of: a heater for said fluid mounted in said vehicle and connected to said engine for heating said fluid to a predetermined temperature, said heater including a combustion chamber having a first igniter and a second igniter mounted therein and fuel supply means for supplying fuel to said chamber for ignition by said first and second igniters; and a control circuit for controlling the operation of said heater, said control circuit including first control means responsive to temperature variations of said fluid in said system for energizing said first igniter and second control means responsive to temperature variations in said second igniter for deenergizing said first igniter and permitting said second igniter to accomplish the ignition of said fuel.

5. In a temperature regulating apparatus for regulating the temperature of a fluid in the cooling system or lubricating system of a vehicular engine, the combination of: a heater for said fluid mounted in the vehicle and connected to said engine for heating said fluid to a predetermined temperature, said heater including a combustion chamber having a first igniter and a second igniter mounted therein, said second igniter being juxtaposed to said first igniter, and fuel supply means for supplying fuel to said chamber for ignition by said igniters; and a control circuit for controlling the operation of said heater, said control circuit including first control means responsive to temperature variations of the fluid in said system for energizing said first igniter, and second control means responsive to temperature variations in said second igniter for deenergizing said first igniter to permit said second igniter to accomplish the ignition of said fuel.

6. In a temperature regulating apparatus for regulating the temperature of a fluid in the cooling system or lubricating system of a vehicular engine, the combination of: a heater for said fluid mounted in said vehicle and connected to said engine for heating said fluid to a predetermined temperature, said heater including a combustion chamber having an electrically heated first igniter and a second combustion gas heated igniter mounted therein and fuel supply means for supplying fuel to said chamber for ignition by said igniters; and a control circuit for controlling the operation of said heater, said circuit including first control means responsive to temperature variations in the fluid in said system for energizing said first igniter and second control means responsive to temperature variations in said second igniter for deenergizing said first igniter and permitting said second igniter to accomplish the ignition of said fuel.

7. In a temperature regulating apparatus for regulating the temperature of a fluid in the cooling system or lubricating system of a vehicular engine, the combination of: a heater for said fluid mounted in said vehicle and connected to said engine for heating said fluid to a predetermined temperature, said heater including a combustion chamber having a first igniter and a second igniter mounted therein and fuel supply means for supplying fuel to said chamber for ignition by said igniters; and a control circuit for regulating the operation of said heater, said control circuit including first thermostatic control means responsive to temperature variations in said fluid in said system for energizing said first igniter and second thermostatic control means responsive to temperature variations in said second igniter for deenergizing said first igniter to permit said second igniter to accomplish the ignition of said fuel.

8. In a temperature regulating apparatus for regulating the temperature of a fluid in the cooling system or lubricating system of a vehicular engine, the combination of: a heater for said fluid mounted in said vehicle and connected to said engine for heating said fluid to a predetermined temperature, said heater including a combustion chamber having an igniter mounted therein and fuel supply means for supplying fuel to said chamber for ignition by said igniter, said fuel supply means including pump means for pumping fuel through said fuel supply means; and a control circuit for regulating the operation of said heater, said control circuit including control means in said system responsive to temperature variations in said fluid for energizing said igniter and control means responsive to temperature variations in said igniter for energizing said pump to supply fuel to said combustion chamber for ignition by said igniter.

9. In a temperature regulating apparatus for regulating the temperature of a fluid in the cooling system or lubricating system of a vehicular engine in a vehicle having a passenger compartment, the combination of: a heater for said fluid mounted in said vehicle for heating said fluid to a predetermined temperature, said heater having a combustion chamber with an igniter mounted therein, fuel supply means connected to said combustion chamber and a fluid chamber juxtaposed to said combustion chamber and continually in communication with the cooling system of said engine to transmit heat from said combustion chamber to said fluid, said heater having a heated air outlet duct communicating with said passenger compartment; and a control circuit for regulating the operation of said heater, said control circuit including control means responsive to temperature variations of said fluid in said system for automatically energizing and deenergizing said heater.

10. In a temperature regulating apparatus for regulating the temperature of a fluid in the cooling system or lubricating system of a vehicular engine, the combination of: a heater having a combustion chamber, an igniter mounted in said combustion chamber, fuel supply means connected to said combustion chamber, a fluid chamber juxtaposed to and encompassing said combustion chamber and connected to the system of said engine to transmit heat from said combustion chamber to said fluid; and a control circuit for governing the operation of said heater, said control circuit including control means adapted to energize and deenergize said heater in accordance with fluctuations in the temperature of the fluid in said system.

11. In a temperature regulating apparatus for regulating the temperature of a fluid in the cooling system or lubricating system of a vehicular engine, the combination of: a heater having a combustion chamber, an igniter mounted in said combustion chamber, fuel supply means connected to said combustion chamber, said fuel supply means including pump means for pumping fuel into the interior of said chamber, and a fluid chamber juxtaposed to said combustion chamber and connected to the system of said engine to transmit heat from said combustion chamber to said fluid; and a control circuit for regulating the operation of said heater, said control circuit including control means responsive to temperature variations in said fluid for energizing said igniter and control means resepsonsive to temperature variations in said igniter for energizing said pump means to supply fuel to said combustion chamber.

12. In a temperature regulating apparatus for regulating the temperature of a fluid in the cooling system or lubricating system of a vehicular engine, the combination of: a heater having a combustion chamber, an igniter mounted in said combustion chamber, fuel supply means connected to said combustion chamber, a fluid chamber juxtaposed to said combustion chamber and connected to the system of said engine to transmit heat from said combustion chamber to said fluid, and an air chamber juxtaposed to said fluid chamber for transferring heat from said fluid to said air; and a control circuit for regulating the operation of said heater, said control circuit including control means responsive to temperature variations in the fluid in said system for energizing and deenergizing said heater.

13. In a temperature regulating apparatus for regulating the temperature of a fluid in the cooling system or lubricating system of an engine mounted in a vehicle having an engine compartment and a passenger compartment, the combination of: a heater, said heater having a combustion chamber, an igniter mounted in said combustion chamber, fuel supply means connected to said combustion chamber, a fluid chamber juxtaposed to said combustion chamber and connected to the system of said engine to transmit heat from said combustion chamber to said fluid, an air chamber juxtaposed to said fluid chamber for transferring heat from said fluid to said air, and means on said air chamber for alternatively directing said heated air into either said passenger or engine compartment; and a control circuit for controlling the operation of said heater, said control circuit including control means responsive to temperature variations of the fluid in said system for automatically energizing and deenergizing said heater.

14. In a temperature regulating apparatus for regulating the temperature of a fluid in the cooling system or lubricating system of an engine mounted in a vehicle having an engine compartment and a passenger compartment, the combination of: a heater, said heater having a combustion chamber, an igniter mounted in said combustion chamber, fuel supply means connected to said combustion chamber, a fluid chamber juxtaposed to said combustion chamber and connected to the system of said engine to transmit heat from said combustion chamber to said fluid, an air chamber juxtaposed to said fluid chamber for transferring heat from said fluid to said air, said air chamber having an air inlet and first and second air outlets, said first air outlet communicating with said passenger compartment and said second air outlet communicating with said engine compartment, and air controlling means associated with said air chamber adapted to cause said air to flow alternatively through either said first air outlet or said second air outlet; and a control circuit for regulating the operation of said heater, said control circuit including control means for energizing and deenergizing said heater in response to fluctuations in the temperature of the fluid in the systm of said engine.

15. In a temperature regulating apparatus for regulating the temperature of a fluid in the cooling system or lubricating system of an engine mounted in a vehicle, the combination of: a heater, said heater having a combustion chamber, an igniter mounted in said combustion chamber, fuel supply means connected to said combustion chamber, a fluid chamber juxtaposed to said combustion chamber and connected to the system of said engine to transmit heat from said combustion chamber to said fluid, an air chamber juxtaposed to said fluid chamber, said air chamber having an air inlet connected thereto, and an air blower connected to said inlet; and a control circuit for regulating the operation of said heater, said control circuit including control means for energizing and deenergizing said heater and control means responsive to temperature variations in said igniter for actuating said blower.

16. In a temperature regulating apparatus for regulating the temperature of a fluid in the cooling system or lubricating system of an engine mounted in a vehicle having an engine compartment and a passenger compartment, the combination of: a heater, said heater having a combustion chamber, an igniter mounted in said combustion chamber, fuel supply means connected to said combustion chamber, air supply means connected to said combustion chamber, a fluid chamber juxtaposed to said combustion chamber and connected to the system of said engine to transmit heat from said combustion chamber to said fluid, an air chamber juxtaposed to said fluid chamber for transferring heat from said fluid to said air, and an air blower connected to said air supply means of said combustion chamber and to said air chamber; and a control circuit for controlling the operation of said heater, said control circuit including control means responsive to temperature variations of the fluid in said system for energizing and deenergizing said heater and control means responsive to temperature variations in said igniter for energizing said blower to force air into said combustion chamber and into said air chamber.

17. In a temperature regulating apparatus for regulating the temperature of a fluid in the cooling and lubricating systems of a vehicular engine, the combination of: a heater mounted in said vehicle, said heater having a combustion chamber, an igniter mounted in said combustion chamber, fuel supply means connected to said combustion chamber, a coolant chamber juxtaposed to said combustion chamber and connected to the cooling system of said engine to transmit heat from said combustion chamber to said coolant, and a lubricant chamber juxtaposed to said coolant chamber and connected to the lubricating system of said engine to transmit heat from said coolant to said lubricant; and a control circuit for controlling the operation of said heater, said control circuit including control means responsive to temperature variations of the fluid in said cooling system.

18. In a temperature regulating apparatus for regulating the temperature of the coolant in the cooling system and of the lubricant in the lubricating system of a vehicular engine, the combination of: a heater mounted in said vehicle, said heater having a combustion chamber, an igniter mounted in said combustion chamber, fuel supply means connected to said combustion chamber, a coolant chamber juxtaposed to said combustion chamber and connected to the cooling system of said engine to transmit heat from said combustion chamber to said coolant, a lubricant chamber juxtaposed to said coolant chamber and encompassing said coolant chamber to permit said lubricant to be heated by said coolant in said coolant chamber; and a control circuit for regulating the operation of said heater, said control circuit including control means adapted to energize and deenergize said heater in response to temperature variations in said coolant.

CHARLES M. BACKUS.

REFERENCES CITED

The following references are of record in the file of this patent:

UNITED STATES PATENTS

| Number | Name | Date |
|---|---|---|
| 1,529,906 | Morris | Mar. 17, 1925 |
| 1,613,347 | Ermatinger | Jan. 4, 1927 |
| 2,046,812 | Danuser et al. | July 7, 1936 |
| 2,074,168 | Danuser et al. | Mar. 16, 1937 |
| 2,257,755 | Morici et al. | Oct. 7, 1941 |
| 2,300,011 | Rose | Oct. 27, 1942 |
| 2,405,144 | Holthouse | Aug. 6, 1946 |
| 2,405,145 | Holthouse | Aug. 6, 1946 |

FOREIGN PATENTS

| Number | Country | Date |
|---|---|---|
| 454,893 | Great Britain | Oct. 9, 1936 |
| 545,957 | Great Britain | June 19, 1942 |